United States Patent
Callon (10) Patent No.: US 7,206,861 B1
(45) Date of Patent: Apr. 17, 2007

(54) NETWORK TRAFFIC DISTRIBUTION ACROSS PARALLEL PATHS

(75) Inventor: Ross W Callon, Westford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 816 days.

(21) Appl. No.: 10/208,250

(22) Filed: Jul. 29, 2002

(51) Int. Cl.
*G06F 15/173* (2006.01)
*H04L 12/28* (2006.01)
*H04L 12/56* (2006.01)

(52) U.S. Cl. ...................... 709/242; 370/389
(58) Field of Classification Search ........ 709/223–224, 709/238, 239, 241, 242–244, 249; 370/229, 370/233, 235, 236, 238, 351, 395.32, 230, 370/237, 242, 252, 394, 428, 389; 711/216, 711/221
See application file for complete search history.

(56) References Cited

U.S. PATENT DOCUMENTS

| 6,091,725 | A * | 7/2000 | Cheriton et al. ............ 370/392 |
| 6,118,760 | A * | 9/2000 | Zaumen et al. ............. 370/229 |
| 6,243,667 | B1 * | 6/2001 | Kerr et al. .................... 703/27 |
| 6,651,099 | B1 * | 11/2003 | Dietz et al. ................. 709/224 |
| 6,909,713 | B2 * | 6/2005 | Magnussen et al. ........ 370/389 |
| 6,980,550 | B1 * | 12/2005 | Yip et al. .................... 370/392 |
| 2001/0043585 | A1 * | 11/2001 | Hummel ...................... 370/351 |
| 2004/0013113 | A1 * | 1/2004 | Singh et al. ................. 370/389 |

OTHER PUBLICATIONS

U.S. Appl. No. 10/293,785, entitled "Distribution of Label Switched Packets," filed Nov. 12, 2002, Dennis C. Ferguson et al.

\* cited by examiner

*Primary Examiner*—Rupal Dharia
*Assistant Examiner*—Sean Reilly
(74) *Attorney, Agent, or Firm*—Shumaker & Sieffert, P.A.

(57) ABSTRACT

Techniques are described for distributing network traffic across parallel data paths. For example, a router may perform a hash on routing information of the packet to generate a hash value corresponding to the packet flow associated with the packet. The router may map the hash value of the packet to a forwarding element associated with a data path. The router may dynamically update the mapping of hash values to forwarding elements in accordance with traffic flow statistics. In this manner, the router may distribute the packet flows from data paths with high volumes of traffic to data paths with smaller volumes of traffic. The router may further prevent out of sequence delivery of packets by updating the mapping upon a gap in the packet flow exceeding a threshold gap. For example, the router may update the mapping when a packet for a packet flow associated with the particular hash value has not been received for at least a defined time interval.

47 Claims, 9 Drawing Sheets

NETWORK TRAFFIC DISTRIBUTION ACROSS PARALLEL PATHS

TECHNICAL FIELD

The invention relates to computer networks and, more particularly, distribution of traffic within computer networks.

BACKGROUND

A computer network is a collection of interconnected computing devices that can exchange data and share resources. In a packet-based network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Computer networks may have parallel data paths. For example, a network may have a number of interconnected intermediate devices that provide connectivity from an inbound edge router to an outbound edge router. Similarly, a communication device within a computer network may have multiple internal data paths. For example, a network router may have multiple forwarding engines to forward packets between input interfaces and output interfaces. As a result, some of the packets traveling between two locations may make use of one path, while other packets may make use of one or more alternate paths.

The sequence in which a device receives the packets may be important. For instance, a device may need to receive the packets in the sequence the source device sent the packets. Example applications that require in-sequence delivery include support of the Asynchronous Transfer Mode (ATM) over router networks, link emulation using the Internet Protocol (IP) or the Multiprotocol Label Switching (MPLS) protocol, and High-Level Data Link Control (HDLC) over IP or MPLS. Traffic may arrive out of order if packets belonging to the same packet flow are communicated using alternate paths. Further, the traffic may not be distributed evenly among the paths, which may result in congestion on one data path and unused bandwidth on another. This may decrease the efficiency of the network and increase packet latency.

SUMMARY

In general, the invention is directed to techniques for distributing traffic across a number of parallel data paths. As used herein, parallel data paths may refer to data paths within a network, such as data paths that have the same source and destination routers, but follow different paths through an intermediate network. For example, in accordance with the Multiprotocol Label Switch (MPLS) protocol, routers within an IP network may construct multiple label switch paths (LSPs) between the same ingress and egress routers using different intermediate routers. In accordance with the principles of the invention, the source router may distribute the traffic across the multiple paths, e.g., the LSPs.

Alternatively, the techniques may be readily applied to parallel data paths within a communication device, such as data paths that begin at the same input interface of a router and end at the same output interface of the router, but traverse through different interconnects. For example, a control unit for a router may implement the techniques to distribute received network traffic across multiple internal forwarding engines.

As described in detail herein, a router maintains a distribution mapping for distributing traffic across multiple data paths. As the router receives packets, the router associates the packets with a particular packet flow, and distributes the packets for the packet flows in accordance with the mapping.

For example, a router may associate a received packet with one of a number of data paths by performing a hash on a portion of the routing information of the packet, referred to as a "key", to generate a hash value. Consequently, the hash value is a function of the packet flow associated with the packet. The key of the packet may include routing information such as the source and destination IP address. The hash function generates a range of hash values, and each packet when hashed corresponds to exactly one of the hash values. The "granularity" of the hash directly correlates with the amount of routing information included in the key. For example, a hash on a key that includes a source and destination IP address is referred to herein as more granular than a hash on a key that includes a source IP address only.

In general, the distribution mapping associates each of the possible hash values with a particular one of the data paths. For example, the distribution mapping may comprise a hash map that associates the possible hash values with a set of pointers, and relay information that defines a set of forwarding elements and is addressable via the set of pointers. For distributing packets across network paths, the forwarding elements may define a set of output interfaces for respective next hops. For distributing packets across internal data paths of a network device, the forwarding elements defined by the relay information may represent internal interconnects, e.g., internal forwarding engines of a routing device that forward packets between input interfaces and output interfaces. In this manner, the router may utilize the distribution map to map the hash values to forwarding elements associated with data paths, and may distribute the traffic across the parallel data paths.

The router may adaptively update the mapping that associates the hash values with particular data paths in accordance with traffic flow statistics. For example, the router may collect traffic flow statistics for each of the hash values. In general, the router receive packets, and update the traffic flow statistics for the hash value associated with the packet, e.g., a packet count and byte count for each of the hash values. Further, the router may maintain an accurate packet count and byte count for each of the data paths, which may include traffic from more than one hash value. Traffic flow statistics may identify data paths with relatively high levels of traffic, i.e. large packet flows, and other of data paths with relatively low levels of traffic. The router may update the mapping to redistribute some of the traffic from data paths with high levels of traffic to data paths with low levels of traffic.

The router may update the mapping that associates the hash values with particular data paths upon identifying within at least one of the hash values, a gap in order to maintain in-sequence delivery of packets of the packet flows. Consequently, the router may maintain in-sequence delivery of packets during the redistribution of traffic and, more particularly, during the update of the mapping of hash values with particular data paths by identifying gaps within packet flows corresponding to hash values. For example, upon receiving a packet, the router may set a timestamp corresponding to the hash value of the received packet. The router may compare the current time with the timestamp to determine the amount of time elapsed since receiving a packet, i.e. the gap length, corresponding to the hash value. The router may update the mapping upon the gap length of the packet exceeding a defined threshold gap length. In this manner, the router may wait for the gap length to exceed the defined threshold time, at which time the router may update the mapping of hash values to data paths.

In one embodiment, a method comprises distributing packet flows across a set of data paths in accordance with a distribution map that associates hash values with forwarding elements. The method further comprises updating the distribution map based on traffic flow statistics for the packet flows.

In another embodiment, a method comprises maintaining a distribution map to associate packet flows with next hops. The method also includes distributing packet flows across a set of data paths in accordance with the distribution map. The method further comprises updating the distribution map based on traffic flow statistics for the packet flows.

In another embodiment, a method comprises maintaining a distribution map to associate packet flows with interconnects within a routing device. The method also includes distributing in accordance with the distribution map packet flows across a set of data paths provided between input interfaces and output interfaces provided by the interconnects. The method further comprises updating the distribution map based on traffic flow statistics for the packet flows.

In another embodiment a system comprises a distribution map to associate packet flows with forwarding elements. The system further comprises a control unit to collect traffic statistics for the packets flows, and to update at least a portion of the distribution map in accordance with the traffic statistics.

In another embodiment a computer-readable medium comprises instructions that cause a processor to distribute packet flows across a set of data paths in accordance with a distribution map associating hash values with forwarding elements. The instructions further instruct the processor to update the distribution map based on traffic flow statistics for the packet flows.

In another embodiment, a method comprises distributing packet flows across a set of data paths in accordance with a distribution map that associates packet flows with forwarding elements. The method further comprises identifying within at least one of the packet flows a gap that exceeds a defined threshold. The method also includes updating the distribution map to reassign the packet flow having the identified gap to a different one of the forwarding elements based on traffic flow statistics.

The invention may provide one or more advantages. For example, the described techniques may allow communication devices, e.g., routers, to actively distribute traffic across parallel data paths while maintaining in-sequence delivery of packets. The invention may further decrease packet latency through networks and communication devices. The invention may further allow for an adjustable granularity of traffic distribution. For example, the hash value for a respective packet flow having high traffic levels may be "re-hashed" to divide the hash output into multiple smaller hash outputs, which are then distributed among parallel data paths.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
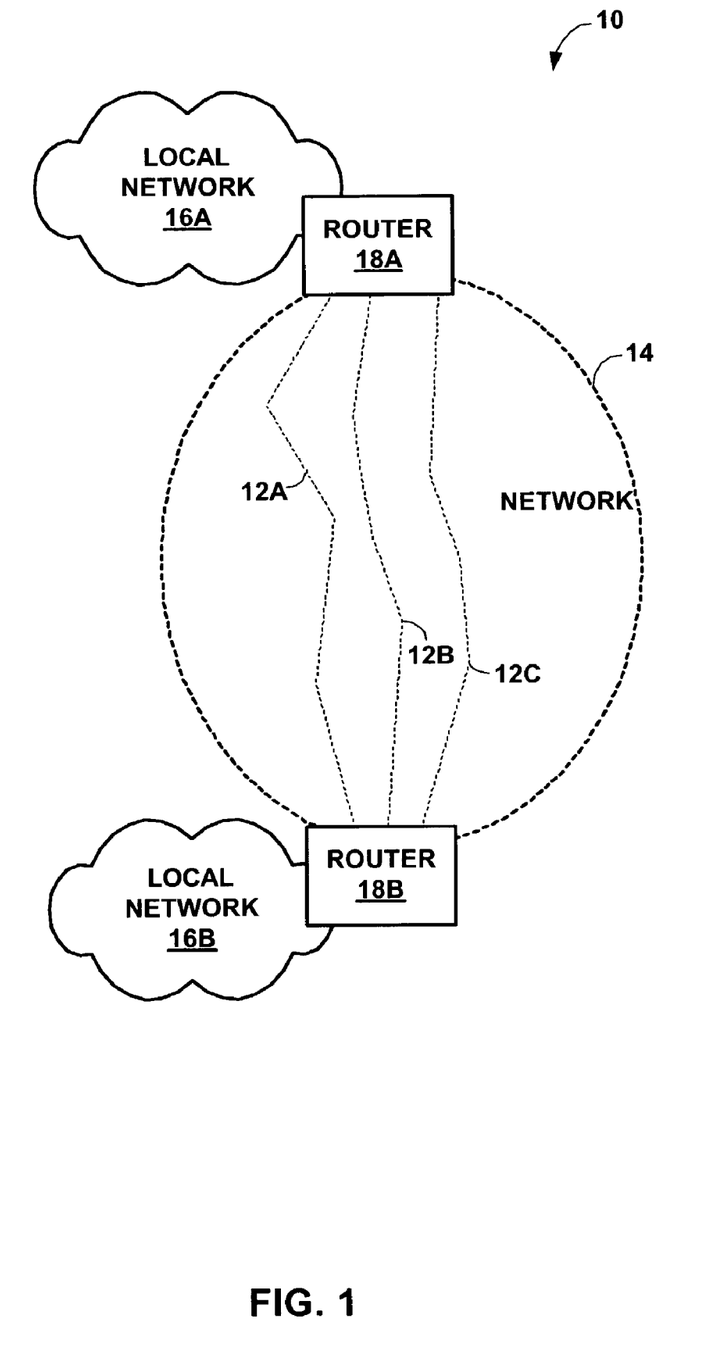
FIG. 1 is a block diagram illustrating an example system in which routers distribute network traffic across parallel data paths in accordance with the principles of the invention.

FIG. 1 is a block diagram illustrating an example system 10 in which routers 18A–18B ("routers 18") distribute network traffic across parallel data paths 12A–12C ("data paths 12") in accordance with the principles of the invention. System 10 includes an intermediate network 14 that communicatively couples local networks 16A–16B ("local networks 16"). Local networks 16 communicate packets through intermediate network 14 using routers 18.

The term "packet" is used herein to generally describe a unit of data communicated between resources in conformance with a communication protocol. The principles of the invention may be readily applied to a variety of protocols, such as Transmission Control Protocol (TCP), the Internet Protocol (IP), Multiprotocol Label Switch (MPLS) Asynchronous Transfer Mode (ATM), Frame Relay, and the like. Accordingly, "packet" is used to encompass any such unit of data, and may be interchanged with the term "cell", or other similar terms used in such protocols to describe a unit of data communicated between resources within the network.

In general, routers 18 receive traffic from local networks 16, and distribute the traffic across parallel data paths 12. Parallel data paths 12 represent data paths within network 14 that begin and end with routers 18, but that utilize different intermediate network devices (not shown) to traverse network 14. For example, routers 18 may utilize several possible next hops for forwarding packet flows via data paths 12, and may distribute the packet flows across the next hops. In this manner, the traffic traverses network 14 via different data paths 12.

As another example, data paths 12 may represent a set of label switch paths (LSPs) between the routers 18 in accordance with the MPLS protocol. Routers 18 may distribute the traffic across the LSPs, resulting in traffic distribution across parallel paths 12.

As described in detail herein, routers 18 receive packets, and associate the packet with a particular packet flow. Routers 18 may further associate each packet flow with a next hop along one of paths 12 and, therefore, an output port for reaching the next hop. In this manner, routers 18 distribute the packet flows across the multiple next hops to control the traffic flow of each data path 12.

Routers 18 may associate a packet with a data path by performing a hash on a portion of the routing information of the packet, referred to as a "key", to generate a hash value corresponding to the packet flow associated with the packet. The key of the packet may include routing information such as the source and destination IP address. The hash function generates a range of hash values, and each packet when hashed corresponds to exactly one of the hash values. The granularity of the hash directly correlates with the amount of routing information included in the key. For example, a hash on a key that includes a source and destination IP address will be more granular than a hash on a key that includes a source IP address only. The key may further include additional routing information such as the protocol type, the source and destination port, the type of service (ToS), as well as any other routing information that remains constant for any one flow of data from source to destination. For packets conforming to protocols such as ATM and MPLS, the key may include routing information such as the ATM Virtual Channel Identifier (VCI), Virtual Path Identifier (VPI), the MPLS labels, as well as other fields such as higher-level MPLS labels or fields in an IP header, which may be encapsulated in an MPLS header.

Routers 18 maintain a distribution mapping for distributing traffic across data paths 12. As routers 18 receive packets, the routers associate the packets with a particular packet flow, and distribute the packets for the packet flows in accordance with the map. In general, the distribution mapping maintained by each of routers 18 associates each of the possible hash values with a particular one of the data paths 12. For example, the distribution mapping may comprise a hash map that associates the possible hash values with a set of pointers, and relay information that defines a set of forwarding elements and is addressable via the set of pointers. For distributing packets across network paths 12, the forwarding elements may define a set of output interfaces for the respective next hops along paths 12.

As described in detail below in reference to FIG. 9, for distributing packets across internal data paths of a network device, e.g., within routers 18, the forwarding elements defined by the relay information may represent internal interconnects, e.g., internal forwarding engines that forward packets between input interfaces and output interfaces. In this manner, routers 18 may utilize their respective distribution mapping to map the hash values to forwarding elements associated with internal data paths, and may distribute the traffic across the parallel data paths.

Routers 18 adaptively update the distribution mapping to dynamically associate the hash values with particular data paths 12 in accordance with traffic flow statistics. Routers 18 may collect traffic flow statistics for each of the hash values. In general, routers 18 receive packets, and update the traffic flow statistics for the hash value associated with the packet. For example, routers 18 may maintain an accurate packet count and byte count for each of the hash values. Further, routers 18 may maintain an accurate packet count and byte count for each of data paths 12, which may include traffic from more than one hash value. For example, routers 18 may include a counter that corresponds to each of the hash values. The counters collect traffic flow statistics for each of the possible hash values. The traffic flow statistics collected may monitor the traffic associated with each of the hash values. Further, router 18 may monitor the amount of traffic traversing a particular one of data paths 12 by using the traffic flow statistics collected. For instance, router 18 may aggregate the traffic flow statistics for each hash value corresponding to a particular data path 12 to obtain flow statistics for that particular data path 12. Traffic flow statistics may identify data paths 12 with relatively high levels of traffic, i.e. large packet flows, and other of data paths 12 with relatively low levels of traffic. Routers 18 may update the mapping to redistribute some of the traffic from data paths 12 with high levels of traffic to data paths 12 with low levels of traffic. The distribution of packet flows from data paths 12 with high levels of traffic to data paths 12 with low levels of traffic may balance the traffic across data paths 12, increasing the efficiency of communication.

Routers 18 may update the mapping that associates the hash values with particular data paths 12 upon identifying within at least one of the hash values a gap in order to maintain in-sequence delivery of packets of the packet flows. Routers 18 may maintain in-sequence delivery of packets during the redistribution of traffic and, more particularly, during the update of the mapping of hash values with particular data paths 12 by identifying gaps within the packet flows corresponding to the hash values. For example, upon receiving a packet, routers 18 may set a timestamp corresponding to the hash value of the received packet. Routers 18 may compare the current time with the timestamp to determine the amount of time elapsed since receiving a packet, i.e. the gap, corresponding to the hash value. Routers 18 may update the mapping upon the gap of the packet exceeding a defined threshold. For example, router 18 may be configured to update the mapping of a particular hash value upon identifying a gap larger than a threshold time, e.g. 10 milliseconds. In this manner, routers 18 may wait for the gap to exceed the defined threshold time, at which time routers 18 may update the mapping of hash values to data paths 12. By waiting for a gap in the data flows, it is possible to reroute the flows to an alternate path while ensuring that the data packets within the flow are delivered in order.

Figure 2:
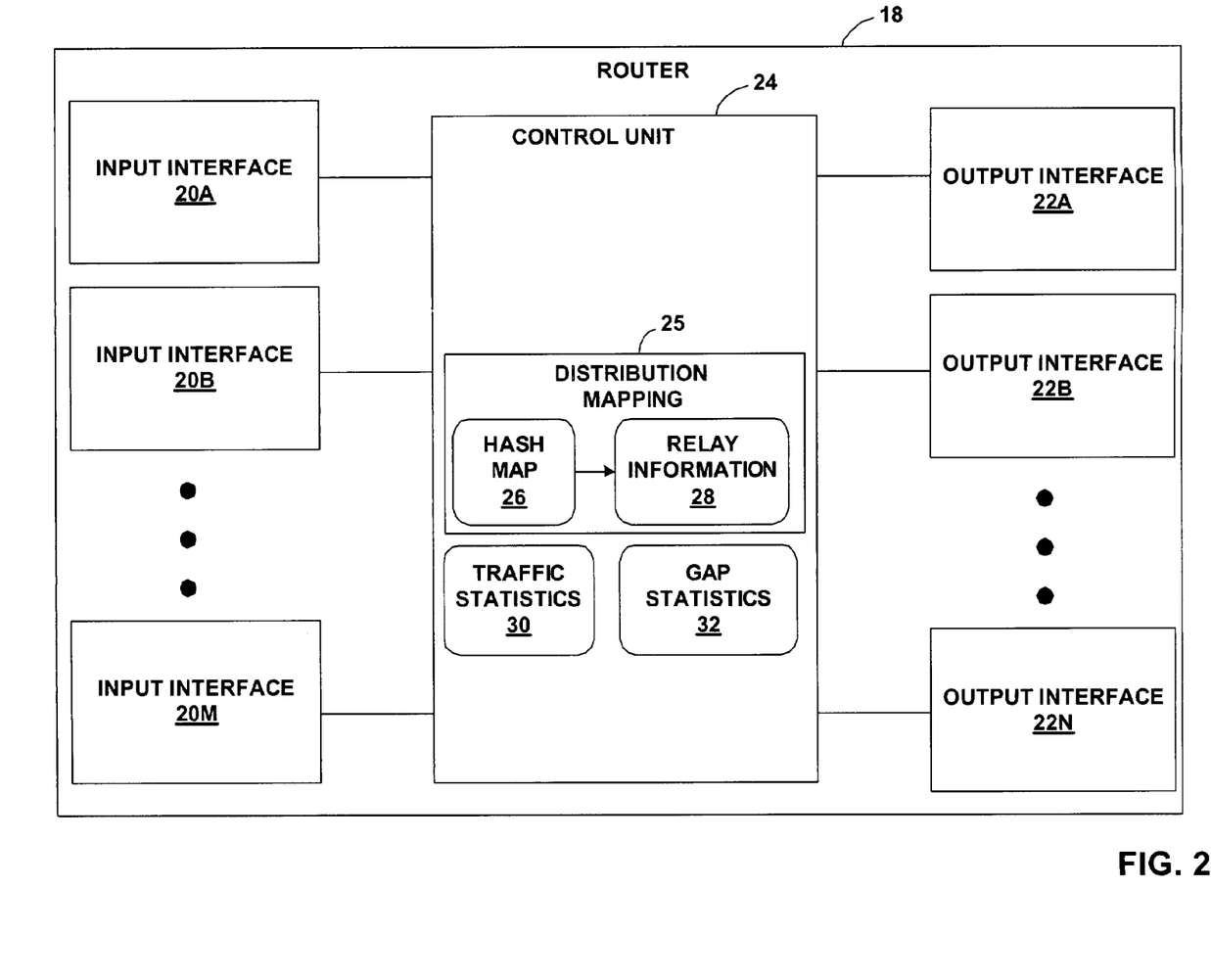
FIG. 2 is a block diagram illustrating an exemplary router that distributes traffic across parallel data paths within a network.

FIG. 2 is a block diagram illustrating an exemplary router 18 that distributes traffic across parallel data paths 12 within network 14. Router 18 includes a plurality of input interfaces 20A–20M ("input interfaces 20") and a plurality of output interfaces 22A–22N ("output interfaces 22") for sending and receiving packets. A single interface card may provide both a number of input interfaces 20 and output interface 22. For example, input interface 20A and output interface 22A may reside on a single interface card coupled to a network via an inbound and outbound network link.

Router 28 further comprises a control unit 24 that receives inbound traffic and distributes the traffic across multiple parallel data paths 12. More specifically, control unit 24 receives an inbound packet from one of input interfaces 20, and associates the packet with a particular packet flow. For example, control unit 24 may perform a hash on a key of the packet to obtain a hash value for the inbound packet. Control unit 24 may maintain a distribution mapping 25 that associates the hash value of the inbound packet with a next hop. Distribution mapping 25 may include a hash map 26 that associates the possible hash values with a set of pointers, and relay information 28 that defines a set of forwarding elements and is addressable via the set of pointers. For distributing packets across network paths 12, the forwarding elements may define a set of output interfaces for the respective next hops along paths 12. In this manner, distribution map 25 maps the hash values to next hops and, more specifically, to output ports of particular data paths 12.

Control unit 24 further maintains traffic flow statistics 30, which tracks the amount of traffic associated with each of the hash values. Traffic flow statistics 30 may track traffic flows using a counter for each of the possible hash values. The counter may track the number of packets received for each hash value, the number of bytes received for each hash value or the like. Traffic flow statistics 30 may further track the amount of traffic corresponding to each of the possible next hops. In this manner, traffic flow statistics 30 may track the amount traffic flow of each of data paths 12. Control unit 24 may update distribution map 25 to distribute the traffic across parallel data paths in accordance with traffic flow statistics 30.

Control unit 24 may further maintain gap statistics 32. Gap statistics 32 may track gaps within hash values using timestamps that indicate the time at which the last packet of a particular hash value was received, counters tracking the amount of time elapsed since the last packet of a particular hash value was received, or the like. Control unit 24 may use gap statistics 32 to determine a time at which to update the distribution of traffic across parallel data paths while maintaining in-sequence delivery of packets. More specifically, control unit 24 uses gap statistics 32 to determine the appropriate time to update the mappings of hash values to next hops.

Control unit 24 may arrange distribution map 25, hash map 26, relay information 28, traffic flow statistics 30, and gap statistics 32 in the form of a variety of data structures, such as a number of tables, link lists, radix trees, databases, flat files, or other data structures. Furthermore, control unit 24 may store the data structures on one or more computer-readable media, such as a magnetic medium, optical medium, non-volatile random access memory (NVRAM), dynamic random access memory (DRAM), FLASH memory, or the like.

Figure 3:
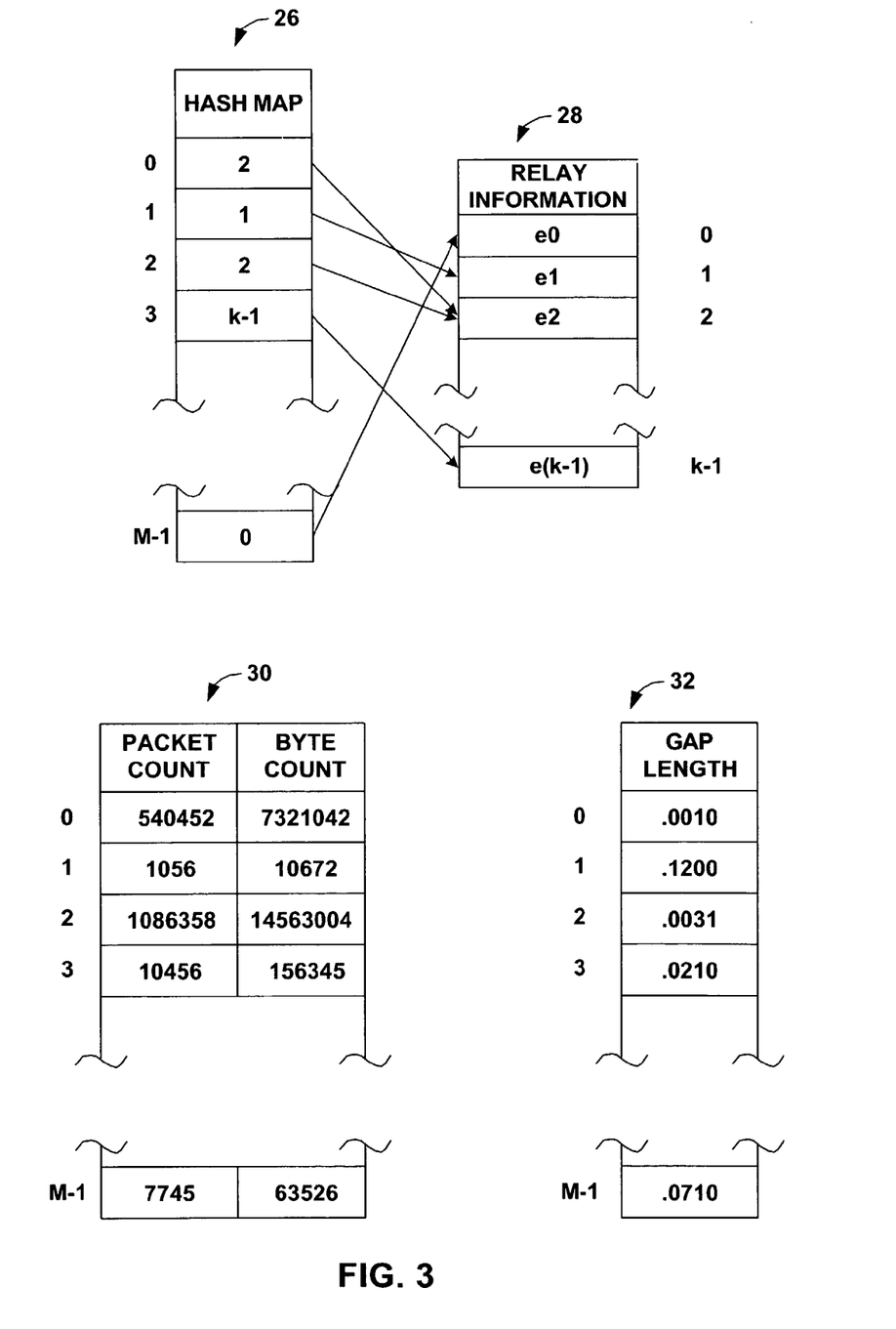
FIG. 3 is a block diagram illustrating exemplary data structures maintained by a router to distribute traffic across parallel data paths.

FIG. 3 is a block diagram illustrating exemplary data structures maintained by router 18 to distribute traffic across parallel data paths. In the example, hash map 26 comprises a table in which each row represents an association of a hash value to relay information. For each association, hash map 26 includes, for each of the M possible hash values, a pointer to relay information 28.

Relay information 28, as illustrated for exemplary purposes, comprises a table in which each row represents next hops for an associated data path. Relay information 28 includes next hops for each of the possible data paths. Relay information 28 includes k sets of next hops. Ideally, the size of hash map 26 (M) is relatively large compared with the size of relay information 28 (k). For example, M may equal 128 and k may equal 8. In this manner, control unit 24 may map more than one hash value to each data path.

In the example of FIG. 3, pointer values stored within the elements of hash map 26 map to indices into relay information 28, as indicated by dashed arrows. For example, the element of hash map 26 corresponding to a hash value 0 stores index 2, which maps hash value 0 to the next hop e2, as stored by relay information 28.

Traffic flow statistics 30 are illustrated as a table in which each row represents traffic flow information for a particular hash value. For each hash value traffic flow statistics 30 includes the packet count for the hash value and the byte count for the hash value. Traffic flow statistics 30 may maintain information for each of the M possible hash values. Control unit 24 may use traffic flow statistics 30 to distribute the packet flows of each hash value across the possible data paths. For example, the traffic flow statistics collected may indicate that the amount of traffic traversing the data path corresponding to next hop e2 is relatively high compared to the amount traffic traversing data paths corresponding to the other next hops. Next hop e2 includes the packet flows corresponding to the hash value 0 and hash value 2. The packet counts and byte counts of hash value 0 and 2 are much larger than the packet and byte counts of the other hash values. In order to decrease the volume of traffic traversing next hop e2, control unit 24 may update the mapping of hash values to next hop associated with data paths with higher traffic levels, e.g., hash value 0 or 2, to a next hop associated with a data path with a lower traffic level, such as next hop e1.

Gap statistics 32 are illustrated as a table in which each row represents the amount of time elapsed since last receiving a packet with a particular hash value. Each row includes a timing mechanism, such as a timestamp or a counter. Gap statistics 32 may track the amount of time elapsed since receiving a packet, i.e. the gap length, of a particular hash value for each of the M possible hash values. Router 18 may use gap statistics 32 to maintain in-sequence delivery while updating the mapping of hash values to next hop of data paths. For example, control unit 24 may compare the amount of time elapsed since receiving a packet with a particular hash value, i.e. the gap length of the hash value, with a defined threshold gap. Control unit 24 may wait until the gap length exceeds the defined threshold gap before updating the mapping. If control unit 24 determines that the gap length associated with a hash value rarely or never increases beyond the defined threshold gap, the control unit may perform a second hash on the packets for the packet flows associated with the hash value to increase the granularity of analysis and distribution. For example, control unit 24 may select a new key for the second hash function to include additional routing information from the packets, e.g., the protocol type, the source and address port, or the like.

The data of FIG. 3 is illustrated for exemplary purposes, and may be readily varied. For example, traffic flow statistics 30 may only include packet counts or byte counts, but not both. Further, traffic flow statistics 30 may include counter data for each of the data paths. Relay information 38 may include port information, output interface information, or the like.

Figure 4:
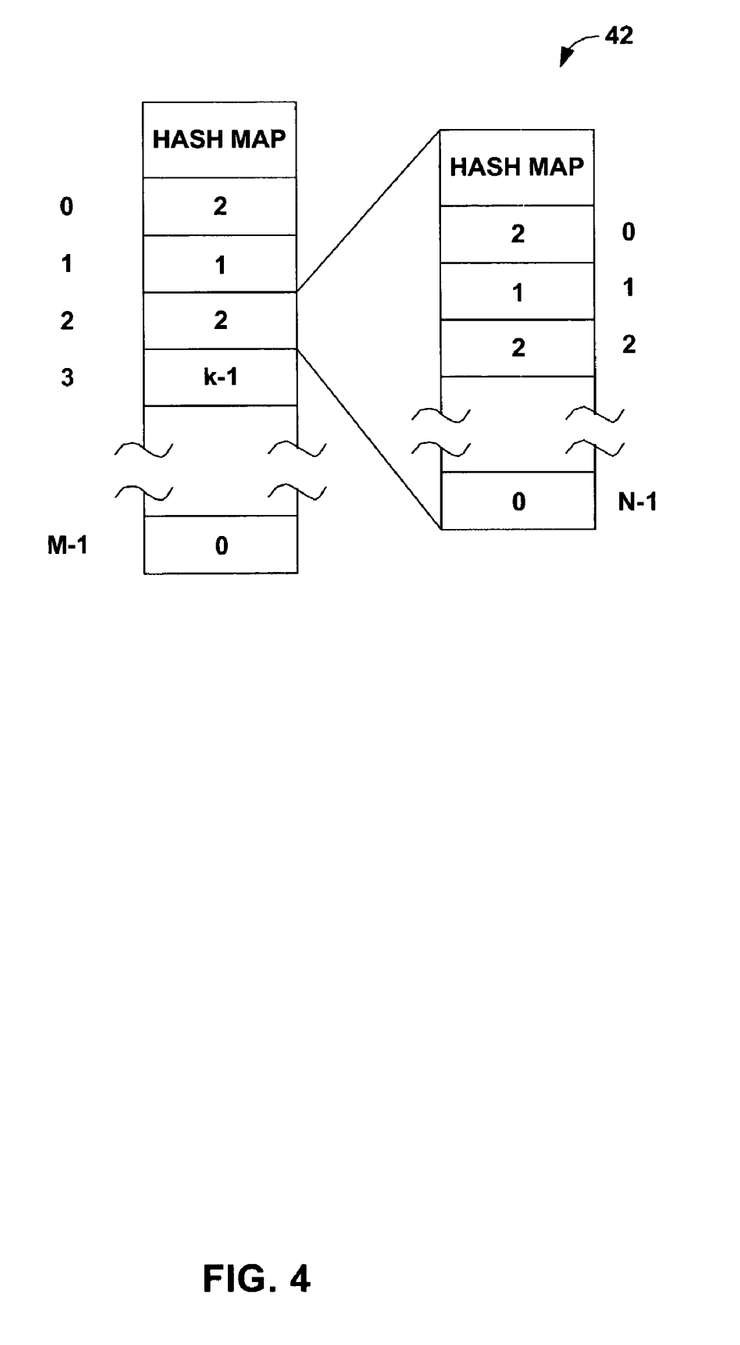
FIG. 4 is a block diagram illustrating an exemplary data structure maintained by a control unit upon performing a second hash to increase the granularity of traffic distribution.

FIG. 4 is a block diagram illustrating an exemplary data structure maintained by control unit 24 upon performing a second hash to increase the granularity of traffic distribution. FIG. 4 illustrates an exemplary hash map 42 that includes a hash value, i.e. hash value 2, for which packets are "re-hashed" to increase the granularity of analysis and distribution. For example, control unit 24 may determine that the arrival time for the packets of the flows associated with hash value 2 has not increased beyond the defined threshold gap during a defined period of time, e.g. 10 times the defined threshold gap. Upon expiration of the defined period of time, new inbound packets associated with hash value 2 are again hashed using a key having more detailed routing information from the packets to increase the granularity of the hash. For example, control unit 24 may select a new key for the second hash function to include additional routing information from the packets, e.g., the protocol type, the source and address port, or the like.

Hash map 42 maintains information for N new sub-hash values generated by the second hash function, and associates the sub-hash values with the original hash value resulting from the first hash function, i.e., hash value 2. In other words, control unit 42 applies a first hash function to a received packet to generate one of M hash values. For those M hash values for which more granular analysis and distribution is enabled, control unit 42 may then apply a second hash function to the packet using a different key to generate one of N sub-hash values.

Each of the new sub-hash values may be assigned a pointer to one of the k possible next hops. Further, traffic flow statistics 30 and gap statistics 32 may refine the granularity of analysis to track statistics for any of the N sub-hash values. In this manner, traffic flow statistics 30 may count the number of packets or bytes for the original set of M hash values, and for the new set of N sub-hash values. Further, gap statistics 32 may track the amount of time elapsed since receiving a packet for all the M hash values and N sub-hash values. Control unit 42 may use the increased granularity to reroute the packet flows corresponding to the sub-hash values. For example, control unit 42 may track the traffic statistics for the packet flows associated with the sub-hash values individually, and reroute the sub-hash value packet flows individually on separate paths on an ongoing basis. In this manner, control unit 42 treats the N sub-hash values as permanent. In another example, control unit 42 may use the increased granularity on a temporary basis. For instance, control unit 42 may track the traffic statistics for the packet flows associated with the sub-hash values. In accordance with the traffic statistics, i.e. identified gaps, control unit 42 may reroute the packet flows associated with each sub-hash value to the same alternate data path. When the packet flows of each of the sub-hash values are rerouted to the new data path, control unit 42 may terminate the increased granularity.

Figure 5:
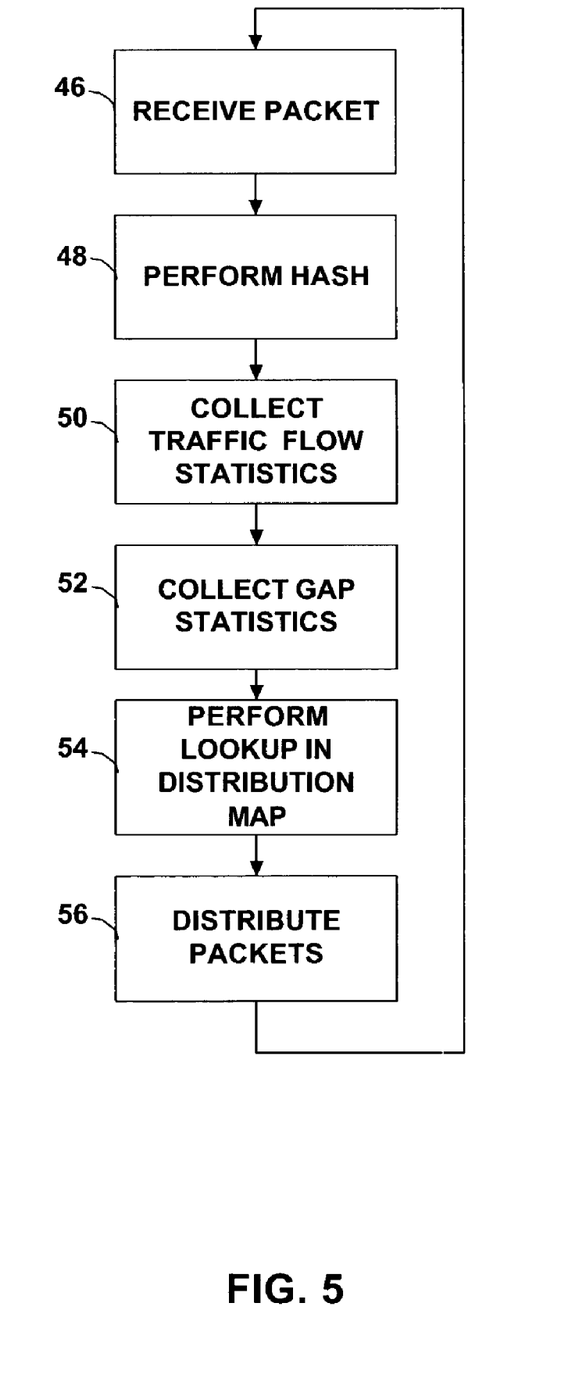
FIG. 5 is a flow chart illustrating an example mode of operation of a router when receiving packets from a network.

FIG. 5 is a flow chart illustrating an example mode of operation of router 18 when receiving packets and distributing the packets across multiple data paths in accordance with the principles of the invention. Initially, router 18 receives an inbound packet from the network via a network link (46). Next, router 18 performs a hash on a key of the inbound packet (48). The key may include routing information such as the source IP address, destination IP address, protocol type, the source and destination port numbers, the class of service (CoS), the type of service (ToS), as well as any other field in the routing information of the packet that remains constant for any one flow of data from source to destination. The amount of routing information included in the key depends on the desired granularity of the hash. For instance, the more routing information included in the hash the more possible hash values, i.e. the more granular the hash.

Router 18 may further collect traffic flow statistics 30 for each of the hash values (50). Router 18 may collect traffic flow statistics 30 with a set of counters. Router 18 associates at least one counter with each of the hash values. The counters may count the number of packets corresponding to each hash value, the number of bytes corresponding to each hash value, or the like. Further, router 18 may associate at least one counter with each of the sets of next hop of relay information 28. For example, router 18 may collect traffic flow statistics for each hash value with a counter to count the number of packets and a counter to count the number of bytes corresponding to each hash value. Router 18 may concurrently collect traffic flow statistics for each set of next hops, which may correspond to more than one hash value. Router 18 may use traffic flow statistics 30 to update the mapping of hash map 26 in order to balance traffic across parallel data paths.

Router 18 may further track gap statistics for each hash value (52). Router 18 may use gap statistics 32 to prevent out of sequence delivery of packets while balancing traffic. Router 18 may track gap statistics 32 by associating a timestamp with each of the hash values. The timestamp may indicate the time at which the last packet with the particular hash value was received. For example, upon identifying the hash value of the packet, router 18 may set a timestamp associated with the hash value. Alternatively, router 18 may track gap statistics 32 with a set of counters. Router 18 may associate at least one counter with each of the hash values. Whenever router 18 receives a packet, the counter associated with the hash value of the packet may be set to a fixed value, and periodically incremented by a specified increment value. For example, when router 18 receives a packet, the counter associated with the hash value of the packet may be set to 0 and the increment value may be set to 1 millisecond. In this manner, the counter may track the amount of time that has elapsed since a packet with the particular hash value was received.

Router 18 performs a look up in distribution map 25 to map the calculated hash value for the packet to one of a set of next hops in accordance with relay information 28 (54), and forwards the packet to network to a corresponding output interface for the identified next hop (56).

Figure 6:
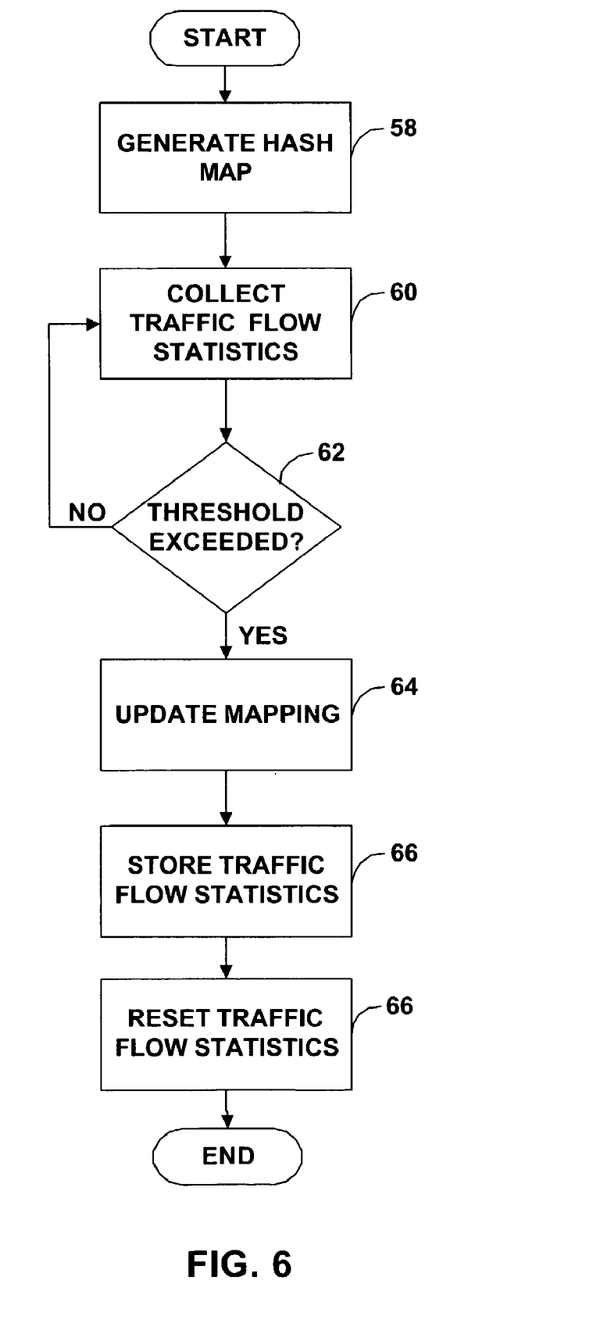
FIG. 6 is a flowchart illustrating router determining whether to update the mapping of hash values to next hops.

FIG. 6 is a flowchart illustrating example operation of router 18 in dynamically updating the mapping of hash values to next hops. Initially, router 18 generates hash map 26 to associate each hash value with a next hop via a pointer, e.g., index, or data structure (58). Notably, the number of possible hash values may be significantly larger than the number of next hops. In the case of a large number of hash values, router 18 may associate the same next hop to more than one of the hash values. Initially, router 18 may randomly assign pointers to possible hash values, or may assign the pointers based on previously acquired statistics or other mechanisms.

Next, router 18 collects traffic flow statistics 30 for traffic forwarded via the router (60). In particular, router 18 may collect traffic flow statistics for each of the hash values, each next hop, each data path, or the like.

Based on the statistics, router 18 determines whether a threshold, referred to as an update threshold, for any of the hash values has been exceeded (62). The update threshold may comprise a traffic flow threshold, such as a maximum number of bytes received by the router, received for a particular hash value, received for a particular data path, or the like. Alternatively, the update threshold may be a threshold time. For example, router 18 may be configured to periodically update the mapping of hash values to next hops every minute, hour, day, month, or other time period. When the update threshold is not exceeded, router 18 continues to collect traffic flow statistics 30.

When the update threshold is exceeded, router 18 updates the mapping of hash values to next hops in accordance with the collected traffic flow statistics (64). For example, router 18 may update the mapping of hash values from next hops corresponding to data paths with high levels of traffic to next hops of data paths with smaller levels of traffic. In this manner, router 18 may distribute the traffic across parallel data paths. In one embodiment, router 18 may perform the update using a single atomic function. The atomic function may allow router 18 to update the distribution of packet flows between packet forwarding times. For instance, router 18 may take into account the identity of the previous packet forwarded, and fully update the forwarding hardware before forwarding the next packet.

Router 18 may further store traffic flow statistics 30 in order to maintain historical traffic flow data, and may reset the traffic flow statistics collectors, e.g. counters, upon finishing the updating of distribution map 25 (66, 68).

Figure 7:
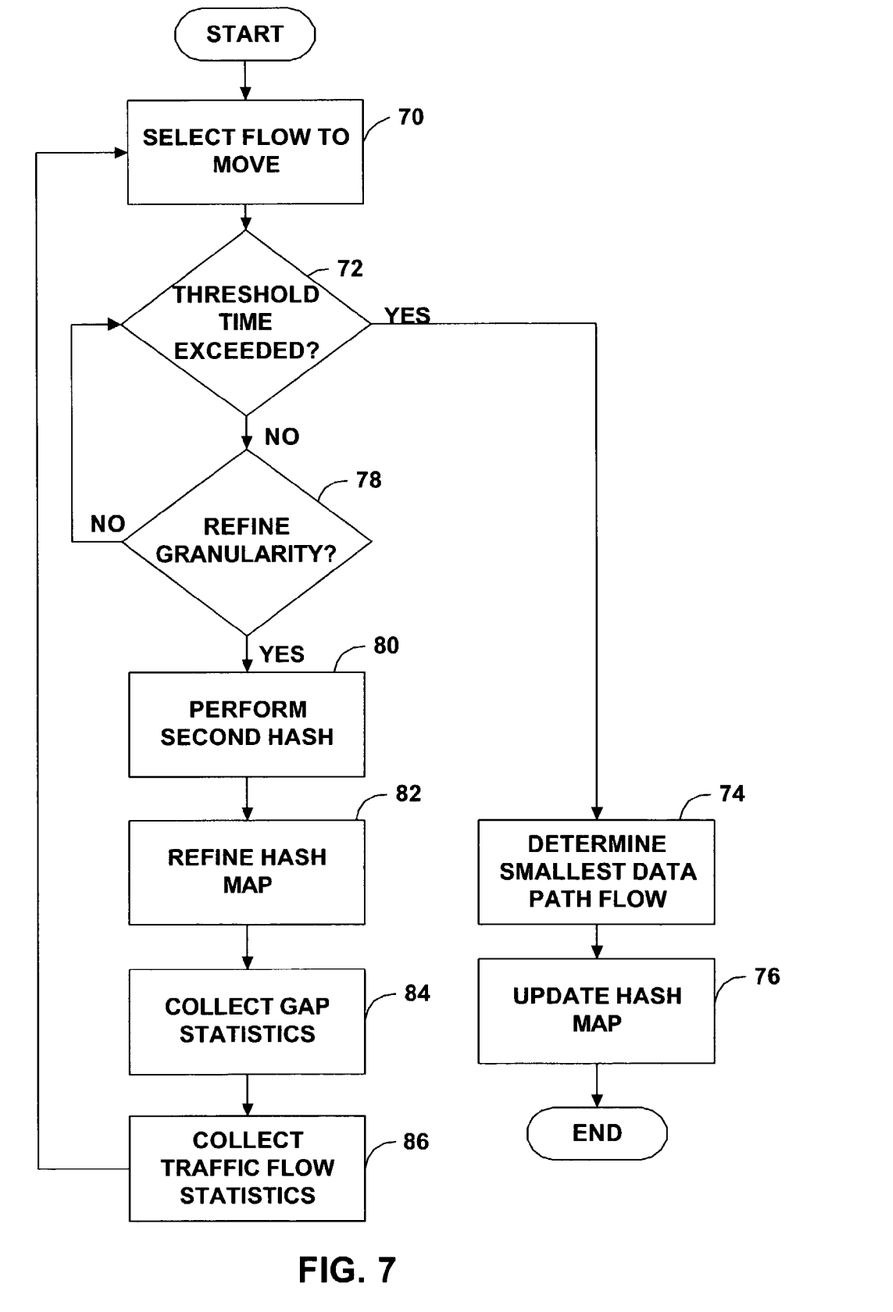
FIG. 7 is a flowchart illustrating a router updating the mapping of a hash map upon exceeding an update threshold.

FIG. 7 is a flowchart illustrating an example operation of router 18 when updating distribution map 25 to dynamically redistribute packet flows across the data paths. When at least one update threshold has been exceeded, router 18 selects at least one packet flow associated with a particular hash value as a candidate packet to reassign to a different hash value (70). In order to optimize the assignment of packet flows to data paths, router 18 may reassign large flows to paths before small flows. However, large flows may be difficult to move, as sufficient gaps in packet arrival times may not readily occur. Accordingly, small flows may be easier to move to new paths due to more frequent gaps in packet arrival time.

Next, router 18 determines whether a gap for the selected flow exceeds a threshold time (72). The threshold time may be configured by an administrator, or may be computed in real-time based on traffic loads within the network. Router 18 may compare a counter that tracks the amount of time since the last packet of the flow was received, i.e. the gap length, with the threshold time. When the gap length of the selected flow exceeds the threshold time, router 18 determines the data path with the smallest flow from the traffic flow statistics (74). Router 18 updates the mapping of the hash value to the next hop corresponding to the data path with the small flow (76).

When the arrival gap of the selected flow does not exceed a threshold time, router 18 determines whether to refine the granularity of the hash for the selected flow (80). For example, gap lengths of large flows may rarely, or never, exceed the threshold time. To update the mapping of flows to data paths while maintaining in-sequence delivery router 18 may need to divide the large flows into subsets of smaller flows and redistribute the smaller flows across the data paths. Router 18 may, for example, refine the granularity of the hash for the selected flow when the gap length of the flow does not exceed the threshold time within a certain time frame. When router 18 elects not to refine the granularity of the hash, router 18 continues to determine whether the gap length of the selected flow exceeds the threshold time.

When router 18 determines the granularity of the hash for the selected flow needs to be refined, router 18 performs a second hash on the packet to further divide the traffic into more granular flows (82). Router 18 may perform a second hash on a key of the packets that includes more packet routing information in order to generate sub-hash values, and to increase the granularity of the traffic analysis. For example, router 18 may perform a first hash on a first key that includes only the IP source and destination addresses to determine a first hash value for the packets. For those packets having a first hash value for which more detailed is required, router 18 may perform a second hash on a second key that may further include the protocol type and the source and destination port numbers. Upon performing the second hash, router 18 may update hash map 26 to include entries that map the sub-hash values of the second hash to next hops (84). Router 28 may further update traffic flow statistics 30 and gap statistics 32 to collect traffic flow statistics and gap statistics for the sub-hash values of the second hash (86, 88).

Figure 8:
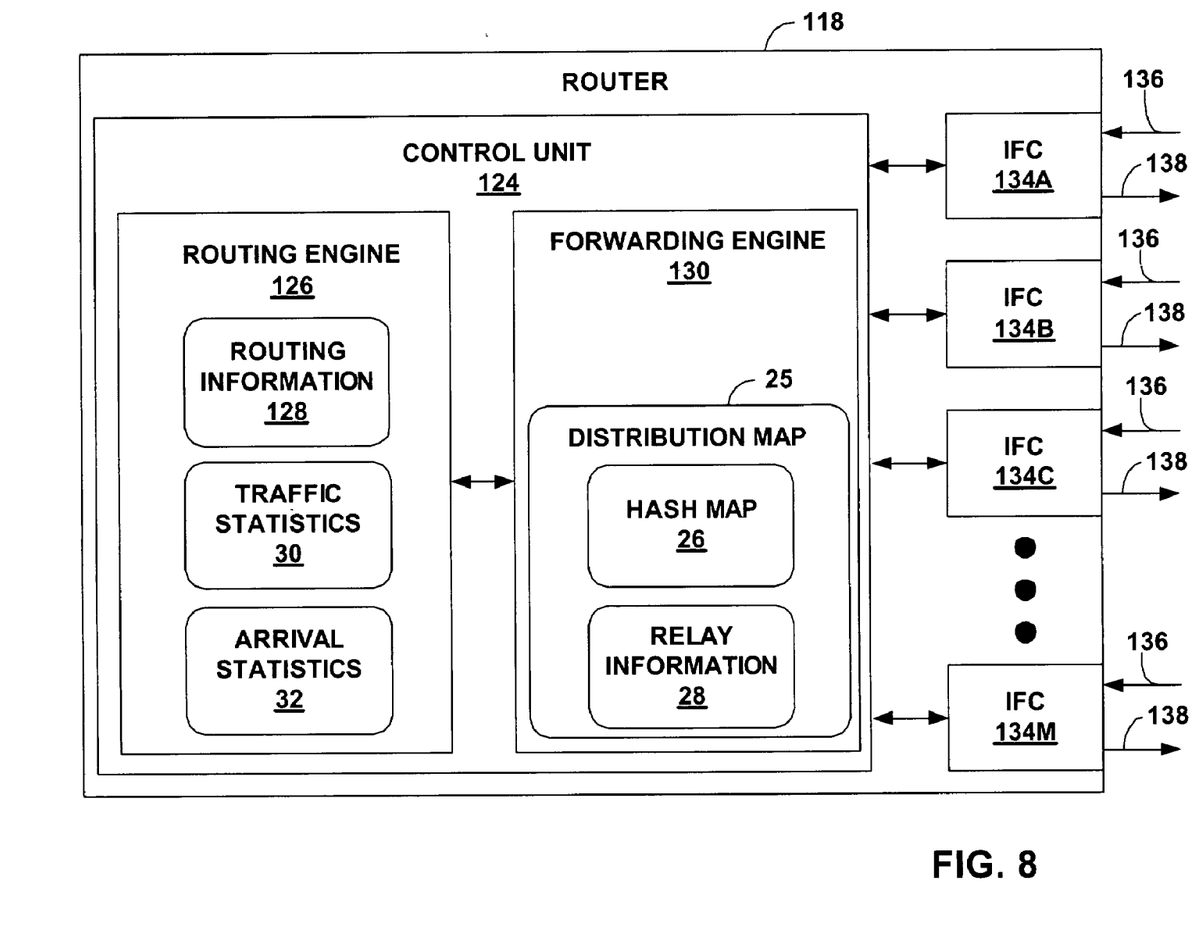
FIG. 8 is a block diagram illustrating another exemplary router that distributes traffic across parallel data paths within a network.

FIG. 8 is a block diagram illustrating another exemplary router 118 that distributes traffic across parallel data paths in accordance with the invention. Router 118 includes control unit 124 that relays inbound packets between an input interface and an output interface. In particular, the functionality of control unit 124 is divided between a routing engine 126 and a forwarding engine 130.

In this configuration, routing engine 126 is responsible for maintaining routing information 128 to reflect the current topology of the IP network. In particular, routing engine 126 periodically updates routing information 128 to accurately reflect the network topology. Routing engine 126 may further be responsible for collecting traffic flow statistics 30 and. Routing engine 126 may further maintain gap statistics 32.

In accordance with routing information 128, forwarding engine 130 maintains distribution map 25 that maps hash values to next hops. Distribution map 25 may include relay information 26 that specific next hops with corresponding interface ports of one of interface cards (IFCs) 134A–134M ("IFCs 134").

IFCs 134 may include an input interface and an output interface that communicate packets with a network via network links 136 and 138. IFCs 134 are typically coupled to network links 136 and 138 via a number of interface ports.

Router 118 receives a packet via an input interface of one of IFCs 134 and more particularly, via one of network links 136. Routing engine 126 performs a hash on a key of the packet to determine the hash value associated with the packet. Routing engine 126 may further update traffic flow statistics 30 and gap statistics 32. For example, routing engine 126 may increment a packet counter associated with the hash value within traffic flow statistics 30 and set a timestamp associated with the hash value within gap statistics 32. The packet may be forwarded to the network via one of IFCs 134 in accordance with distribution map 25 and, more particularly in accordance with hash map 26 and relay information 28.

In one embodiment, forwarding engine 130 and routing engine 126 may comprise one or more dedicated processors, hardware, and the like, and may be communicatively coupled by a data communication channel. The data communication channel may be a high-speed network connection, bus, shared-memory or other data communication mechanism. Forwarding engine 130, routing engine 126, or both, may make use of the data structures and organization described above.

Figure 9:
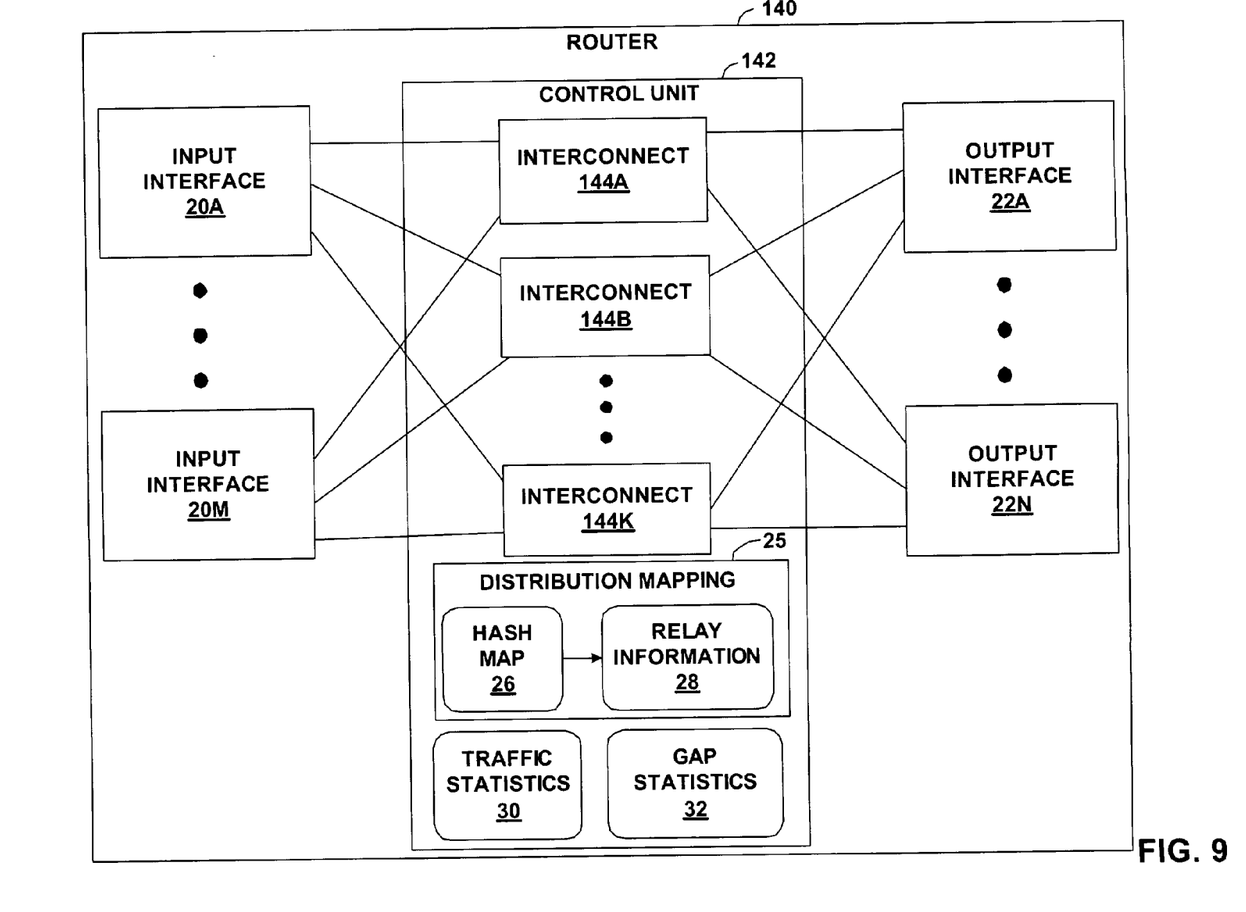
FIG. 9 is a block diagram of an exemplary router that distributes traffic across parallel data paths internal to the router.

FIG. 9 is a block diagram of an exemplary router 140 that distributes traffic across multiple parallel data paths within router 140. In other words, the techniques described herein may be readily applied to distributing packet flows across data paths internal to a router or other network device, and are not limited to distribution of traffic across network paths.

Router 140 includes a plurality of input interfaces 20A–20M ("input interfaces 20") and a plurality of output interfaces 22A–22N ("output interfaces 22") for sending and receiving packets. As discussed above, a single interface card may function as both an input interface 20 and an output interface 22. As used in reference to FIG. 9, parallel data paths refer to paths within router 140 that begin at a common one of input interfaces 20, and end at a common one of output interfaces 22 of router 140, but traverse through different interconnects 144. In the illustrated example of FIG. 9, packets may be forwarded from input interface 20A to output interface 22A via any of the K interconnects 144, resulting in K different paths between input interface 20A and output interface 22A.

Router 140 includes a control unit 142 that maintains a distribution map 25. As discussed previously, distribution map 25 may include a hash map 26 and relay information 28. Router 140 may further maintain traffic flow statistics 30 and gap statistics 32. The data structures shown in FIG. 3 may be similar to the data structures maintained by router 140, except the next hops may be replaced with specific interconnects. Control unit 142 further includes interconnects 144A–144K ("interconnects 144") across which the packet flows are distributed. For example, router 140 may distribute packets flowing from input interface 20A to output interface 22A across interconnects 144. In this manner, there may be K paths between input interface 20A and output interface 22A. Interconnects 144 may include switches, forwarding engines, or any other connection that couples input interfaces 20 with the output interfaces 22.

Input interfaces 20 may perform a hash on the inbound packet to obtain a hash value. Input interfaces 144 may access hash map 26 and relay information 28 of control unit 142 to determine which interconnect 144 to relay the packet. Alternatively, input interfaces 20 may maintain hash map 26 and relay information 28. Input interfaces 20 relay the packet to the particular one of interconnects 144 that corresponds to the hash value of the packet.

Control unit 142 updates traffic flow statistics 30 and gap statistics 32 associated with the particular hash value to reflect the reception of the packet. Interconnects 144 may relay the packet to the appropriate output interface 22. Alternatively, interconnects 144 may perform a second hash on the packet and distribute the packet across parallel data paths within network 14. In this manner, router 140 may distribute traffic across multiple data paths within router 140 and within network 14.

A number of embodiments of the present invention have been described. Nevertheless, it will be understood that various modifications may be made without departing from the spirit and scope of the invention. Accordingly, other embodiments are within the scope of the following claims.

The invention claimed is:

1. A method comprising:
    distributing packet flows across a set of data paths in accordance with a distribution map that associates a first set of hash values with forwarding elements, wherein the first hash values are generated by application of a first hash function to first information within packets of the packet flows;
    determining that an amount of elapsed time since receiving a packet for the packet flows associated with a first one of the hash values has not exceeded a threshold time; and
    in response to the determination, increasing the granularity of the distribution map to include a second set of one or more hash values generated by application of a second hash function to second information within the packet flows.

2. The method of claim 1, further comprising:
    collecting traffic flow statistics for the second hash values; and
    associating the second hash values with one or more of the forwarding elements in accordance with the traffic flow statistics to reassign the packet flows associated with the first one of the hash values to different forwarding elements.

3. The method of claim 1, further comprising:
    identifying a gap in which no packet was received for the packet flows for at least one of the hash values of the first or second set of hash values, wherein the gap in the packet flows exceeds a second threshold length of time; and
    upon identifying the gap, updating the distribution map to reassign the hash value having the identified gap to a different one of the forwarding elements based on traffic flow statistics for the packet flows.

4. The method of claim 3, wherein the forwarding elements comprise identifiers for next hops along network data paths.

5. The method of claim 4, wherein updating the distribution map comprises reassigning at least one hash value from a first next hop to a second next hop.

6. The method of claim 4, wherein distributing packet flows comprises:
    applying the first or second hash function to routing information of each of the packets to generate a respective hash values, wherein the routing information includes a source address, a destination address and at least one additional parameter selected from the set of a protocol, a source port, and a destination port;
    selecting next hops for the packets in accordance with the respective hash values; and
    forwarding the packets to the selected next hops.

7. The method of claim 3, wherein the forwarding elements comprise identifiers for interconnects coupling input interfaces of a routing device to output interfaces of the routing device.

8. The method of claim 7, wherein updating the distribution map comprises reassigning at least one hash value from a first interconnect to a second interconnect.

9. The method of claim 7, wherein distributing packet flows comprises
    applying the first or second hash function to routing information of each of the packets to generate respective hash values;
    selecting interconnects for the packets in accordance with the respective hash values; and
    relaying the packets from input interface cards to output interface cards via the selected interconnects.

10. The method of claim 3, wherein distributing the packets comprises:
    applying the first or second hash function to generate hash values for packet flows for the received packets; and
    forwarding the packets in accordance with the hash values for the respective packet flows of the packets.

11. The method of claim 3, wherein identifying the gap includes:
    setting a counter associated with one of the hash values to a defined value upon receiving a packet corresponding to the hash value; and
    incrementing the counter periodically by an increment value.

12. The method of claim 3, wherein identifying the gap includes:
    setting a timestamp associated with one of the hash values upon receiving a packet corresponding to the hash value; and
    comparing the timestamp with the current time.

13. The method of claim 3, further comprising collecting traffic flow statistics.

14. The method of claim 13, wherein collecting traffic flow statistics includes incrementing a counter associated with one of the hash values upon receiving a packet corresponding to the hash value.

15. The method of claim 13, wherein the counter is one of a packet counter and a byte counter.

16. The method of claim 3, wherein updating the distribution map includes reassigning the hash values to forwarding elements corresponding to data paths with lower levels of traffic.

17. The method of claim 3, wherein the distribution map includes a hash map that associates hash values with pointers and relay information that associates the pointers with forwarding elements.

18. A method comprising:
maintaining a distribution map to associate packet flows with next hops, wherein the next hops are associated with different parallel data paths from a source to a destination, and wherein the distribution map associates a first set of hash values of the packet flows with the next hops, the first hash values being generated by application of a first hash function to first information within packets of the packet flows;
distributing packet flows across the next hops in accordance with the distribution map;
determining that an amount of elapsed time since receiving a packet for the packet flows associated with a first one of the hash values has not exceeded a first threshold length time;
in response to the determination, increasing the granularity of the distribution map to include a second set of one or more hash values generated by application of a second hash function to second information within the packet flows;
identifying a gap in the packet flows for a first one of the hash values of the first or second set of hash values, wherein the gap in the packet flows exceeds a second threshold length of time; and
upon identifying the gap, updating the distribution map to reassign the first hash value having the identified gap from a first one of the next hops to a different one of the next hops based on traffic flow statistics for the packet flows associated with the first one of the hash values.

19. The method of claim 18, wherein distributing packet flows comprises:
identifying packets with particular packet flows;
selecting next hops for the packets in accordance with the respective packet flows of the packets; and
forwarding the packets to the selected next hops.

20. The method of claim 19, wherein identifying the packets with packet flows includes:
applying the first or second hash function to routing information of each of the packets to generate respective ones of the hash values; and
associating packet flows with the hash values.

21. The method of claim 18, further comprising collecting traffic flow statistics.

22. The method of claim 18, further comprising:
dividing at least one of the packet flows into a set of packet sub-flows;
identifying within at least one for the packet sub-flows a gap that exceeds the second threshold length of time; and
upon identifying the gap within the at least one of the packet sub-flows, updating the distribution map to reassign the packet sub-flows having the identified gap to a different one of the next hops based on traffic flow statistics.

23. The method of claim 22, further comprising updating the distribution map to reassign each of the packet sub-flows to the same next hop.

24. The method of claim 23, further comprising combining the packet sub-flows back to the original packet flow upon reassigning each of the packet sub-flows to the same next hop.

25. A method comprising:
maintaining a distribution map to associate packet flows with interconnects within a routing device, wherein the interconnects are associated with different parallel data paths from a source to a destination, and wherein the distribution map associates a first set of hash values of the packet flows with the interconnects, the first hash values being generated by application of a first hash function to first information within packets of the packet flows;
distributing in accordance with the distribution map packet flows across a set of data paths provided between input interfaces and output interfaces by the interconnects;
determining that an amount of elapsed time since receiving a packet for the packet flows associated with a first one of the hash values has not exceeded a first threshold length time;
in response to the determination, increasing the granularity of the distribution map to include a second set of one or more hash values generated by application of a second hash function to second information within the packet flows;
identifying a gap in the packet flows for a first one of the hash values of the first or second set of hash values, wherein the gap in the packet flows exceeds a second threshold length of time; and
upon identifying the gap, updating the distribution map to reassign the first hash value having the identified gap from a first one of the interconnects to a different one of the interconnects based on traffic flow statistics for the packet flows associated with the first one of the hash values.

26. The method of claim 25, wherein distributing packet flows comprises
identifying packets with particular packet flows;
selecting interconnects for the packets in accordance with the respective packet flows of the packets; and
forwarding the packets to the selected interconnects.

27. The method of claim 26, wherein identifying the packets with packet flows includes:
applying the first or second hash function to routing information of each of the packets to generate a respective one of the hash values; and
associating packet flows with the hash values.

28. The method of claim 25, further comprising collecting traffic flow statistics.

29. The method of claim 25, further comprising:
dividing at least one of the packet flows into a set of packet sub-flows;
identifying within at least one for the packet sub-flows a gap that exceeds the second threshold length of time; and
updating the distribution map to reassign the packet sub-flows having the identified gap to a different one of the interconnects based on traffic flow statistics.

30. A system comprising:
a distribution map to associate packet flows with forwarding elements, wherein the forwarding elements are associated with different parallel data paths from a source to a destination, and wherein the distribution map associates a first set of hash values with the packet flows, the first hash values being generated by application of a first hash function to first information within packets of the packet flows; and
a control unit to collect traffic statistics for the packet flows, and to update at least a portion of the distribution map in accordance with the traffic statistics, wherein the control unit determines that an amount of elapsed time since receiving a packet for the packet flows associated with a first one of the hash values has not exceeded a first threshold length time and, in response to the determination, increases the granularity of the distribution map to include a second set of one or more hash values generated by application of a second hash function to second information within the packet flows At least one input interface;

At least one output interface;

A set of interconnects that couple the input interfaces to the output interfaces; and Wherein the distribution map associates packet flows with interconnects.

31. The system of claim 30, wherein the distribution map includes:
   a hash map to associate packet flows with pointers to forwarding elements; and
   a set of relay information to associate the pointers with the forwarding elements.

32. The system of claim 30, wherein the control unit further maintains gap statistics for each of the hash values to track the amount of time since receiving a packet for each of the packet flows, identifies when a gap in the packet flows associated with a first one of the hash values of the first or second set of hash values exceeds a second threshold length of time and, upon identifying the gap, updates the distribution map to reassign the first hash value from a first one of the forwarding elements to a different one of the forwarding elements based on traffic flow statistics for the packet flows associated with the first one of the hash values.

33. The system of claim 32, wherein the control unit maintains gap statistics by setting a timestamp associated with the packet flows, and comparing the timestamps with the current time.

34. The system of claim 32, wherein the control unit maintains gap statistics by associating a counter with each of the packet flows.

35. The system of claim 30, wherein the number of packet flows and the number of forwarding elements are equal.

36. The system of claim 30, wherein the number of packet flows is larger than the number of forwarding elements.

37. The system of claim 30, wherein the traffic flow statistics collected by the control unit are collected by at least one of a packet counter and a byte counter.

38. The system of claim 30, wherein the interconnects include one of switches and forwarding engines.

39. The system of claim 30, wherein the forwarding elements include at least one of next hops, output interfaces, and interconnects.

40. A computer-readable medium comprising instructions that cause a processor to:
   distribute packet flows across a set of data paths in accordance with a distribution map associating hash values with forwarding elements, wherein the first hash values are generated by application of a first hash function to a first information within packets of the packet flows;
   determining that an amount of elapsed time since receiving a packet for the packet flows associated with a first one of the hash values has not exceeded a threshold time; and
   in response to the determination, increasing the granularity of the distribution map to include a second set of one or more hash values generated by application of a second hash function to second information within the packet flows.

41. The computer-readable medium of claim 40, further comprising instruction to cause a processor to maintain the distribution map to associate hash values with next hops.

42. The computer-readable medium of claim 40, wherein comprising instruction to cause a processor to distribute packet flows includes instructions to:
   apply a hash function to routing information of each of the packets to generate a respective hash value;
   select next hops for the packets in accordance with the respective hash values; and
   forward the packets to the selected next hops.

43. The computer-readable medium of claim 40, further comprising instructions to cause a processor to maintain the distribution map to associate hash values with interconnects within a routing device.

44. The computer-readable medium of claim 43, wherein comprising instruction to cause a processor to distribute packet flows includes instructions to:
   apply a hash function to routing information of each of the packets to generate a respective hash value;
   select interconnects for the packets in accordance with the respective hash values; and
   relay the packets from input interface cards to output interface cards via the selected interconnects.

45. The computer-readable medium of claim 40, wherein comprising instruction to cause a processor to distribute packet flows includes instructions to:
   apply a hash function to generate hash values for packet flows for the received packets; and
   forward the packets in accordance with the hash values for the respective packet flows of the packets.

46. The computer-readable medium of claim 40, further comprising instruction to cause a processor to:
   identify a gap in the packet flows corresponding to at least one of the hash values, wherein the gap in the packet flows exceeds a second threshold length of time; and
   upon identifying the gap, update the distribution map to reassign the hash value having the identified gap to a different one of the forwarding elements based on traffic flow statistics.

47. The computer-readable medium of claim 40, further comprising instruction to cause a processor to collect traffic statistics.

* * * * *

UNITED STATES PATENT AND TRADEMARK OFFICE
CERTIFICATE OF CORRECTION

PATENT NO. : 7,206,861 B1  Page 1 of 1
APPLICATION NO. : 10/208250
DATED : April 17, 2007
INVENTOR(S) : Ross W. Callon It is certified that error appears in the above-identified patent and that said Letters Patent is hereby corrected as shown below:

Column 14, line 7 (claim 6), "a" should be deleted.

Signed and Sealed this

Fourth Day of November, 2008

JON W. DUDAS
*Director of the United States Patent and Trademark Office*